(12) United States Patent
Lee et al.

(10) Patent No.: US 8,999,556 B2
(45) Date of Patent: Apr. 7, 2015

(54) RECHARGEABLE BATTERY

(71) Applicant: Samsung SDI Co., Ltd., Yongin-si, Gyeonggi-do (KR)

(72) Inventors: Chong-Hoon Lee, Yongin-si (KR);
Jun-Sik Kim, Yongin-si (KR);
Tae-Keun Kim, Yongin-si (KR);
Sae-Weon Roh, Yongin-si (KR);
Sung-Soo Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 103 days.

(21) Appl. No.: 13/834,732

(22) Filed: Mar. 15, 2013

(65) Prior Publication Data

US 2014/0038032 A1 Feb. 6, 2014

(30) Foreign Application Priority Data

Jul. 31, 2012 (KR) .......................... 10-2012-0084199

(51) Int. Cl.

| | |
|---|---|
| *H01M 4/583* | (2010.01) |
| *H01M 4/587* | (2010.01) |
| *H01M 10/0585* | (2010.01) |
| *H01M 10/04* | (2006.01) |
| *H01M 2/18* | (2006.01) |
| *H01M 4/64* | (2006.01) |

(52) U.S. Cl.
CPC ................ *H01M 4/583* (2013.01); *H01M 2/18* (2013.01); *H01M 4/587* (2013.01); *H01M 4/64* (2013.01); *H01M 10/04* (2013.01); *H01M 10/0585* (2013.01)

(58) Field of Classification Search
USPC .............. 429/129, 131–133, 136, 209, 231.8, 429/247
See application file for complete search history.

(56) References Cited

U.S. PATENT DOCUMENTS

| | | |
|---|---|---|
| 6,881,514 B2 * | 4/2005 | Ahn et al. ........................ 429/99 |
| 7,697,264 B2 | 4/2010 | Tasaki et al. |
| 2006/0088759 A1 * | 4/2006 | Roh ................................ 429/128 |
| 2007/0196732 A1 * | 8/2007 | Tatebayashi et al. .......... 429/181 |
| 2007/0218355 A1 * | 9/2007 | Ryu et al. ....................... 429/152 |
| 2007/0281214 A1 * | 12/2007 | Saruwatari et al. ....... 429/231.95 |

(Continued)

FOREIGN PATENT DOCUMENTS

| | | | |
|---|---|---|---|
| JP | 60049575 A | * | 3/1985 |
| JP | 04355069 A | * | 12/1992 |
| JP | 08-102315 A | | 4/1996 |

(Continued)

*Primary Examiner* — Gregg Cantelmo
(74) *Attorney, Agent, or Firm* — Robert E. Bushnell, Esq.

(57) ABSTRACT

A rechargeable battery includes an electrode assembly, a case, and an electrode terminal. The electrode assembly including at least a central negative electrode, a pair of positive electrodes disposed on opposite side of the central negative electrode, and pair of outermost negative electrodes adjacent the pair of positive electrodes with a separator separating all the electrodes from each other. The pair of outermost negative electrodes respectively include a negative current collector and negative active material layers formed on both sides of the negative current collector. The case receives the electrode assembly. The electrode terminal includes a positive terminal connected to a positive electrode and a negative terminal connected to a negative electrode.

10 Claims, 9 Drawing Sheets

(56) References Cited

U.S. PATENT DOCUMENTS

| | | |
|---|---|---|
| 2009/0186270 A1* | 7/2009 | Harada et al. ............... 429/185 |
| 2011/0091770 A1 | 4/2011 | Han et al. |
| 2011/0117438 A1 | 5/2011 | Han et al. |
| 2011/0217588 A1 | 9/2011 | Roh et al. |
| 2011/0244304 A1* | 10/2011 | Shinyashiki et al. ......... 429/139 |

FOREIGN PATENT DOCUMENTS

| | | | |
|---|---|---|---|
| JP | 08293325 A | * | 11/1996 |
| JP | 2007027027 A | * | 2/2007 |
| JP | 2007-194090 A | | 8/2007 |
| KR | 10-2004-0092109 A | | 11/2004 |
| KR | 10-2007-0115579 A | | 12/2007 |

* cited by examiner

RECHARGEABLE BATTERY

CLAIM OF PRIORITY

This application makes reference to, incorporates the same herein, and claims all benefits accruing under 35 U.S.C. §119 from an application earlier filed in the Korean Intellectual Property Office on the 31 Jul. 2012 and there duly assigned Serial No. 10-2012-0084199.

BACKGROUND OF THE INVENTION

1. Field of the Invention

The described technology relates generally to a rechargeable battery. More particularly, the described technology relates generally to an electrode assembly structure.

2. Description of the Related Art

A battery represents a device for transforming chemical energy that is generated when a chemical material undergoes an oxidization and reduction reaction into electrical energy. The battery is classified as a primary battery that must be discarded when its energy is used up, and a rechargeable battery. The rechargeable battery is usable multiple times by using a reversible mutual transformation of chemical energy and electrical energy.

The rechargeable battery includes a case, and an electrode assembly received into the case. The electrode assembly includes a positive electrode, a negative electrode, and a separator provided between the electrodes. A plurality of positive electrodes, separators, and negative electrodes can be stacked to form a stacked electrode assembly. Recently, as the rechargeable battery has been more widely used, rechargeable batteries for guaranteeing excellent safety under abnormal conditions such as overcharging are required.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to provide a rechargeable battery for increasing stability in an overcharge condition and minimizing performance deterioration.

An exemplary embodiment provides a rechargeable battery which may include: an electrode assembly including a separator and a positive electrode and a negative electrode that are stacked with the separator therebetween; a case for receiving the electrode assembly; and an electrode terminal connected to the electrode assembly.

The electrode assembly may include a pair of outermost negative electrodes, and the pair of outermost negative electrodes respectively may include a negative current collector and negative active material layers formed on both sides of the negative current collector.

The negative active material layer may include an internal active material layer formed inside the negative current collector and an external active material layer formed outside the negative current collector, and the external active material layer may include the same negative active material as the internal active material layer.

The external active material layer may include graphite.

The external active material layer has the same size and thickness as the internal active material layer.

The external active material layer may include a negative active material that is different from the internal active material layer.

The external active material layer may include one of amorphous carbon and silicon oxide.

The external active material layer may include at least one of crystalline carbon, amorphous carbon, and silicon oxide.

A plurality of positive electrodes and negative electrodes are stacked, and a number of the negative electrodes including the pair of outermost negative electrodes is greater than a number of the positive electrode by one.

One sheet of separator is provided between the positive electrode and the negative electrode.

The separator is disposed to pass through the space between the negative electrodes 50 and the positive electrodes according to a zigzag pattern from the outer side of one of a pair of outermost negative electrodes, and then cover the outer side of the other outermost negative electrode.

The separator is disposed to start from the portion between the positive electrode and the negative electrode provided in the center of the electrode assembly, and wind the portion between the positive electrodes and the negative electrodes toward the outer side of the electrode assembly.

The separator is disposed to wrap the plurality of negative electrodes and the pair of outermost negative electrodes.

According to the present exemplary embodiment, the rechargeable battery can ease extraction of lithium into metal in the overcharge condition. Therefore, overcharge dangers such as thermal runaway and explosion can be prevented by preventing a short circuit of the positive electrode and the negative electrode caused by lithium metal in the overcharge condition, and safety of the rechargeable battery can be improved.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
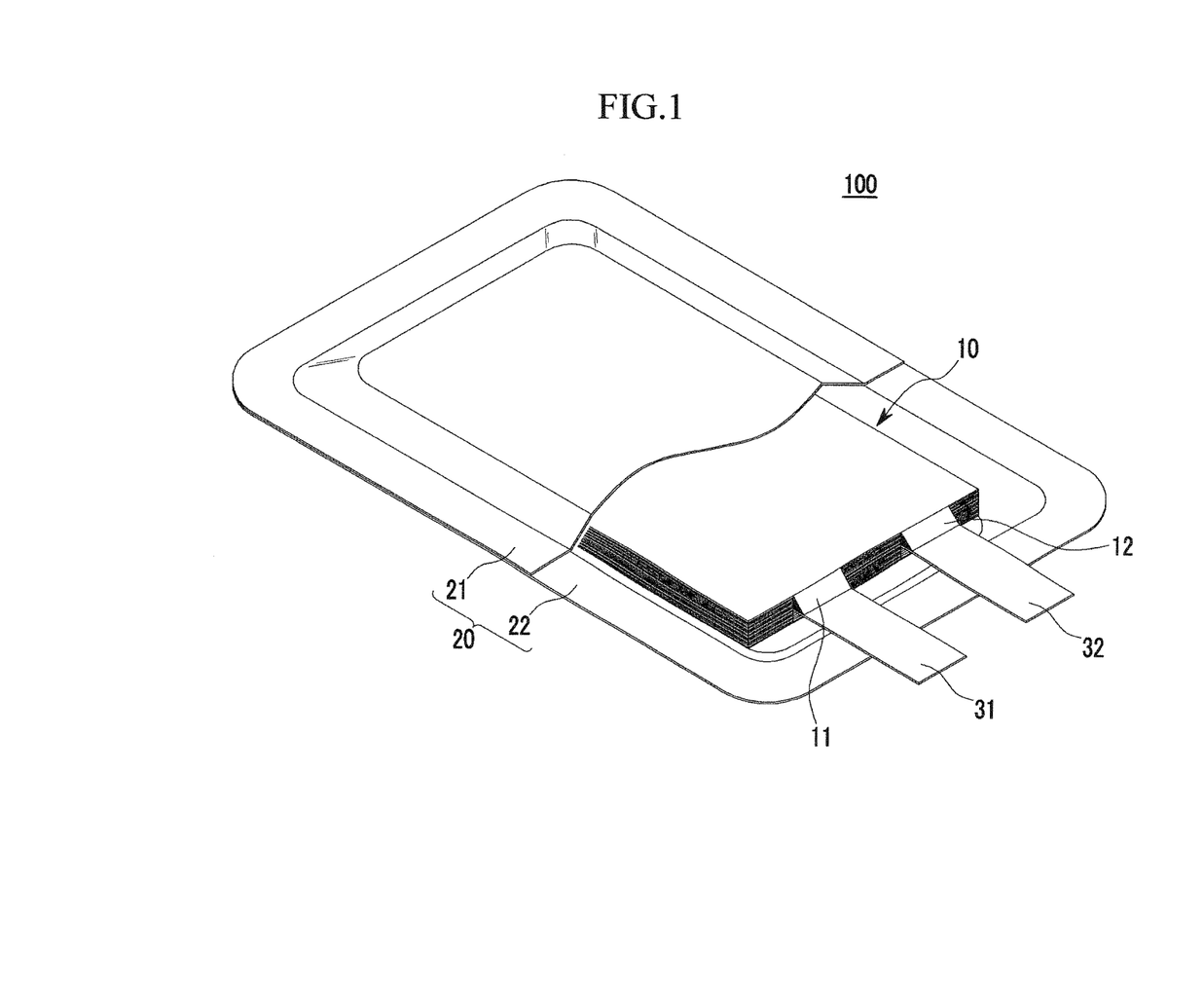
FIG. 1 shows a partially cut-away perspective view of a rechargeable battery according to a first exemplary embodiment of the present invention.
Figure 2:
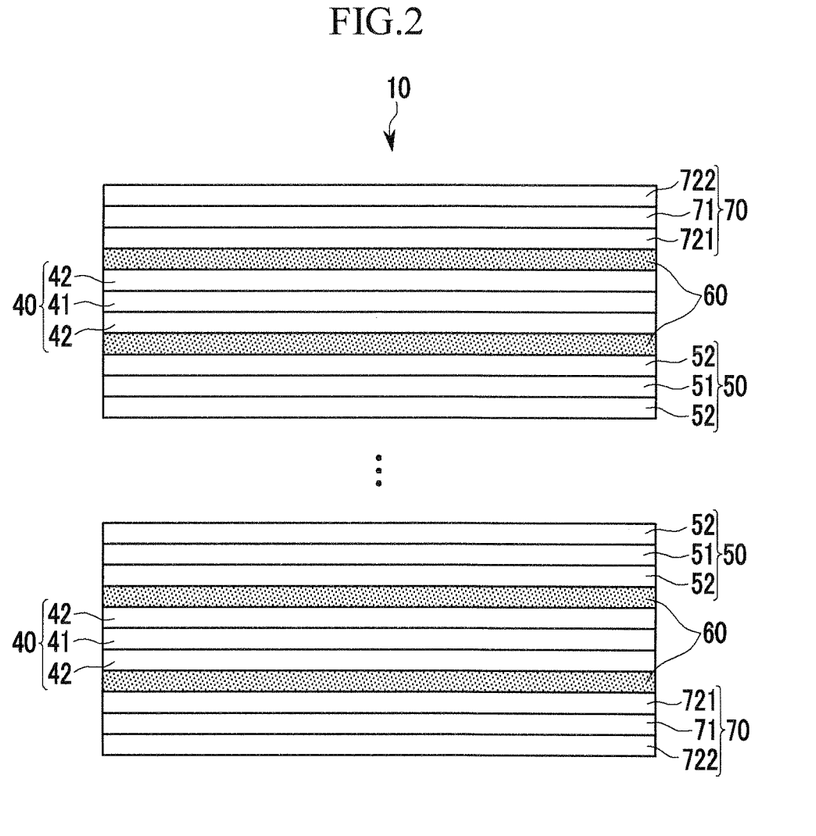
FIG. 2 shows a cross-sectional view of an electrode assembly of a rechargeable battery shown in FIG. 1.

FIG. 1 shows a partially cut-away perspective view of a rechargeable battery according to a first exemplary embodiment of the present invention, and FIG. 2 shows a cross-sectional view of an electrode assembly of a rechargeable battery shown in FIG. 1.

Referring to FIG. 1 and FIG. 2, the rechargeable battery 100 includes an electrode assembly 10 for performing a charging and discharging operation, a case 20 for receiving the electrode assembly 10, and electrode terminals 31 and 32 connected to the electrode assembly 10.

The case 20 forms a shape of the rechargeable battery 100, and it forms an internal space for receiving the electrode assembly 10. The electrode assembly 10 is installed in the case 20 together with an electrolyte solution. The case 20 can have a pouch shape or a square shape. FIG. 1 exemplifies a pouch type case.

The pouch type case 20 includes a top case 21 and a bottom case 22 made of a laminate film. Edges of the top case 21 and the bottom case 22 are integrally bonded through heat fusion to close and seal the electrode assembly 10. A square case is cuboidal and forms an opening on one side. A cap assembly is installed in the opening of the case to seal the case in which the electrode assembly is provided. The case is made of metal such as aluminum, an aluminum alloy, or nickel-plated steel.

Forms and materials of the case 20 are not restricted to the above-noted examples, and they are changeable in various manners according to usage, size, and capacity of the rechargeable battery 100.

The electrode assembly 10 includes a positive electrode 40 a negative electrode 50 and a separator 60 disposed therebetween. Electrode terminals 31 and 32 are configured with the positive terminal 31 connected to the positive electrode 40 and the negative terminal 32 connected to the negative electrode 50. The positive electrode 40 forms a positive uncoated region 11 and the negative electrode 50 forms a negative uncoated region 12. The positive terminal 31 is fixed to the positive uncoated region 11 and the negative terminal 32 is fixed to the negative uncoated region 12.

A part of the positive terminal 31 and a part of the negative terminal 32 are protruded to the outside of the case 20. The positive terminal 31 and the negative terminal 32 are exemplified to be protruded in the same direction in FIG. 1, and they can be protruded in opposite directions. Regarding the square case, a part of the positive terminal and a part of the negative terminal can be protruded to the outside of the cap assembly.

In the rechargeable battery 100, the electrode assembly 10 signifies a stacked electrode assembly in which the positive electrodes 40 and the negative electrodes 50 are alternately stacked. In this instance, the separator 60 is provided between the positive electrode 40 and the negative electrode 50, and the separator 60 can be formed to be the same size as the positive electrode 40 and the negative electrode 50. Here, one separator 60 is individually positioned between the positive electrode 40 and the negative electrode 50.

Additional negative electrodes are disposed in the outermost part of the stacked electrode assembly 10. The negative electrodes positioned in the outermost part of the electrode assembly 10 will be referred to as an outermost negative electrode 70. The pair of outermost negative electrodes 70 are also separated from the positive electrodes 40 with the separator 60. Regarding the electrode assembly 10, a number of all negative electrodes 50 and 70 is greater than a number of all positive electrodes 40 by one.

The positive electrode 40 includes a positive current collector 41 and positive active material layers 42 formed on both sides of the positive current collector 41. The positive current collector 41 is formed with a metal foil or a mesh-structured metal sheet, and is manufactured of aluminum or stainless steel. The positive active material layer 42 includes a positive active material, a binder, and a conductive material. The positive active material can include cobalt, manganese, nickel, and a mixed oxide of a metal selected from a combination thereof and lithium. The positive active material layer 42 can be formed on the positive current collector 41 through coating, or it can be attached thereto by using a lamination method.

The negative electrode 50 includes a negative current collector 51 and negative active material layers 52 formed on both sides of the negative current collector 51. The negative current collector 51 is made of a metal foil that is the same as or different from the positive current collector 41 or a mesh-structured metal sheet. The negative active material layer 52 includes a negative active material, a binder, and a conductive material. The negative active material is a carbon-based material including crystalline carbon such as amorphous, plate-shaped, flake, circular, or fiber-like natural graphite or artificial graphite. The negative active material layer 52 can be formed on the negative current collector 51 through coating, or it can be attached thereto by using the lamination method.

A part of the positive current collector 41 is extended to form the positive uncoated region 11 in which no positive active material layer 42 is formed. A part of the negative current collector 51 is extended to form the negative uncoated region 12 in which no negative active material layer 52 is formed.

The separator 60 made of an insulating and porous material insulates the positive electrode 40 and the negative electrodes 50 and 70, and contains an electrolyte solution to provide a path on which lithium ions move.

The outermost negative electrode 70 includes a negative current collector 71, and negative active material layers 72 formed on both sides of the negative current collector 71. The negative active material layer 72 includes an internal active material layer 721 and an external active material layer 722. The internal active material layer 721 faces the positive electrode 40 with the separator 60 therebetween so it helps the rechargeable battery 100 be charged and discharged. The external active material layer 722 is provided toward the outer side of the electrode assembly 10 and does not face the positive electrode 40 so it has nothing to do with charging and discharging of the rechargeable battery 100, and in the case of overcharge, it uses remaining lithium to ease the overcharge danger of the rechargeable battery 100.

The electrode that is provided in the outermost part of the electrode assembly of the conventional rechargeable battery is one of the positive electrode and the negative electrode, and the active material layer is formed in the current collector so as to prevent unneeded waste of materials since the active material layer provided in the outer side of the current collector does not help the rechargeable battery be charged and discharged.

However, the rechargeable battery 100 is configured so that a pair of outermost negative electrodes 70 are disposed in the outermost part of the electrode assembly 10 on purpose, the outermost negative electrode 70 includes the external active material layer 722 as well as the internal active material layer 721, and the external active material layer 722 uses surplus lithium in the overcharge condition. The external active material layer 722 uses the surplus lithium in the case of overcharging to ease extraction of lithium on a surface of the negative active material layer as a metal.

The conventional lithium ion secondary battery is weak on heat and impacts and it includes a protective circuit so as to prevent overcharging, but it may be overcharged because of the protective circuit is not properly working or by other reasons. In the case of overcharging, the lithium cannot exist as ions and it starts being extracted as metal, and crystals of the lithium metal having a great potential may cause a short circuit of the positive electrode and the negative electrode and it may generate thermal runaway and explosion.

The external active material layer 722 of the outermost negative electrode 70 does not help the charge and discharge reaction in the conventional charge and discharge condition, and it fully uses the surplus lithium in the overcharge condition to thus ease extraction of lithium as a metal on the surface of the negative active material layer. Therefore, the rechargeable battery 100 can efficiently control the danger of overcharging of the rechargeable battery 100 such as thermal runaway and explosion by preventing the short circuit of the positive electrode 40 and the negative electrode 50 caused by the lithium metal.

Also, there is no need to additionally manufacture the negative electrode 50 and a pair of outermost negative electrodes 70 (i.e., it is not needed to form the active material layer inside the outermost electrode) in the rechargeable battery 100 according to the first exemplary embodiment, so it is possible to simplify the process for manufacturing the negative electrodes 50 and 70 and the process for assembling the electrode assembly 10 and easily manufacture the rechargeable battery 100.

The external active material layer 722 of the outermost negative electrode 70 can include the same negative active material as the internal active material layer 721. That is, the external active material layer 722 can include crystalline carbon such as graphite. Further, the external active material layer 722 can include a negative active material that is different from the internal active material layer 721, for example, a material that can absorb lithium under the overcharge condition in a like manner of amorphous carbon and silicon oxide ($SiO_x$) such as soft carbon (low-temperature baked carbon) or hard carbon. When the external active material layer 722 includes a material such as the internal active material layer 721, the process for manufacturing the rechargeable battery 100 can be simplified.

The external active material layer 722 can have the same thickness and size as the internal active material layer 721. In addition, the external active material layer 722 can be thicker than the internal active material layer 721 so as to increase the safety of overcharging. For example, the external active material layer 722 can be 0.5 mm to 1 mm thick. Capacity of the negative active material of the external active material layer 722 may be 330 mAh/g to 390 mAh/g with reference to reversible capacity. The material, thickness, and size of the external active material layer 722 are not restricted to the above description, and they are variable in many ways.

Figure 3:
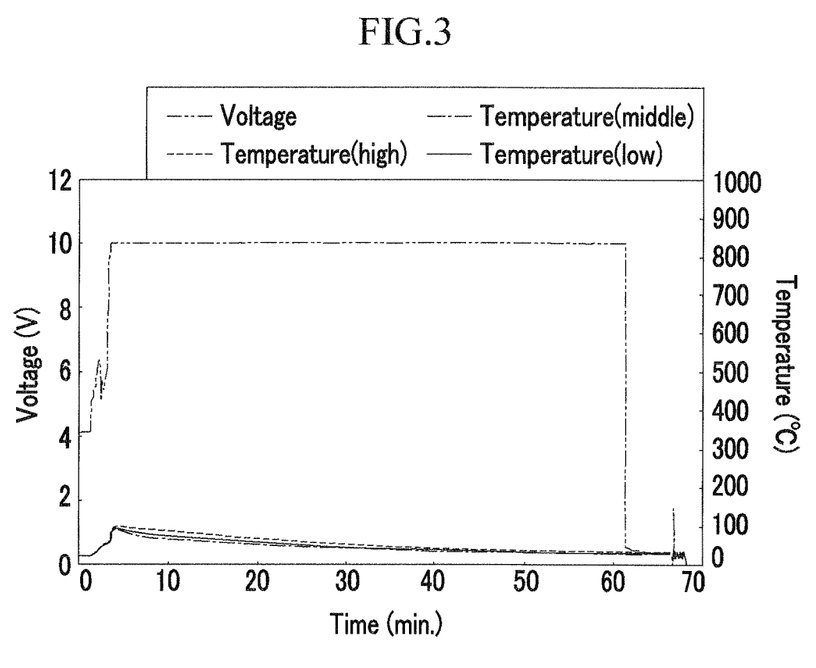
FIG. 3 shows a graph of an overcharging test of a rechargeable battery according to a first exemplary embodiment of the present invention.
Figure 4:
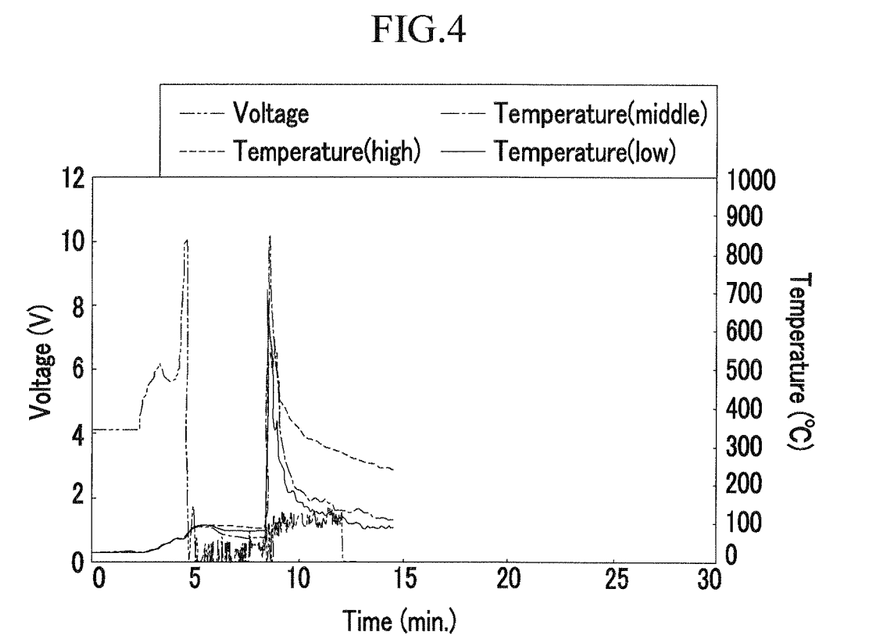
FIG. 4 shows a graph of an overcharging test of a rechargeable battery according to a first comparative example.
Figure 5:
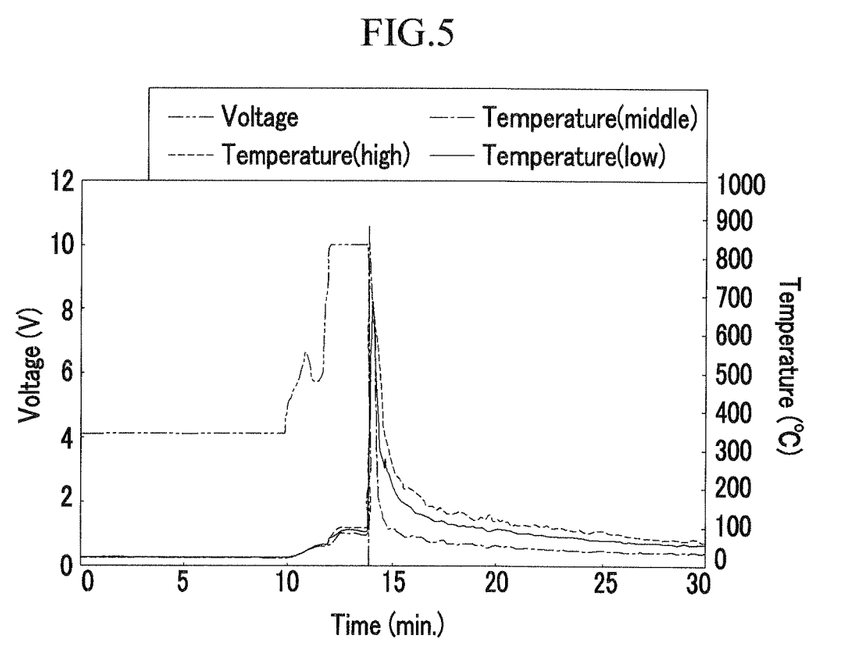
FIG. 5 shows a graph of an overcharging test of a rechargeable battery according to a second comparative example.
Figure 6:
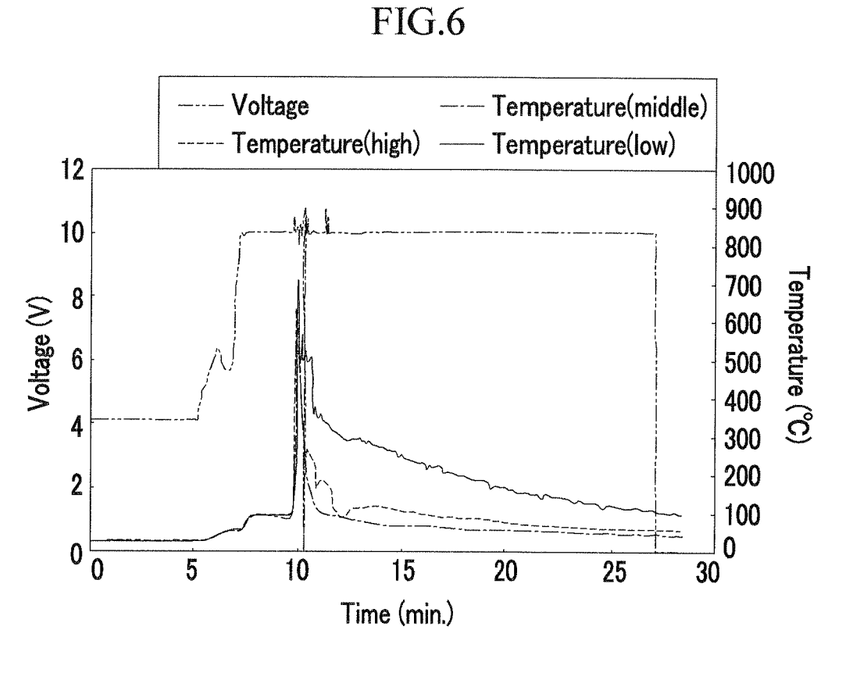
FIG. 6 shows a graph of an overcharging test of a rechargeable battery according to a third comparative example.

FIG. 3 shows a graph of an overcharging test of a rechargeable battery according to a first exemplary embodiment of the present invention, and FIG. 4 to FIG. 6 show graphs of an overcharging test of a rechargeable battery according to first, second, and third comparative examples.

The temperature of the rechargeable battery is measured at three points, and it is sequentially denoted with a temperature (high), a temperature (middle), and a temperature (low) in the close distance order from the electrode terminal.

Regarding the rechargeable battery according to Comparative Example 1, the negative electrode is provided at the outermost part of the electrode assembly, and the outermost negative electrode includes a current collector and an internal active material layer. Regarding the rechargeable battery according to Comparative Example 2, the positive electrode is provided at the outermost part of the electrode assembly, and the outermost positive electrode includes a current collector and an internal active material layer. Regarding the rechargeable battery according to Comparative Example 3, the positive electrode is provided at the outermost part of the electrode assembly, and the outermost positive electrode includes a current collector, an internal active material layer, and an external active material layer.

Referring to FIG. 3, when the rechargeable battery according to the first exemplary embodiment is overcharged, the temperature rises to substantially reach 100° C. and thermal runaway caused by overcharge is not generated. Referring to FIG. 4 to FIG. 6, when the rechargeable battery according to Comparative Example 1 to Comparative Example 3 is overcharged, the temperature rises to be greater than 800° C. and thermal runaway is generated. The thermal runaway can result in an explosion of the rechargeable battery.

According to the above-described experimental result, the rechargeable battery 100 in which the outermost negative electrode 70 includes the external active material layer 722 according to the first exemplary embodiment prevents the thermal runaway caused by overcharge and allows excellent safety.

Figure 7:
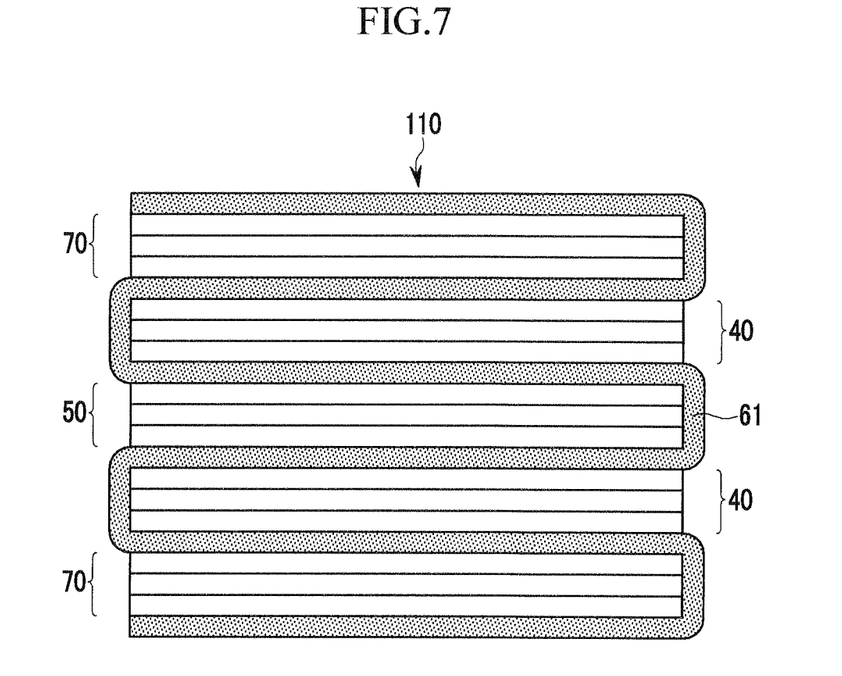
FIG. 7 shows a cross-sectional view of an electrode assembly of a rechargeable battery according to a second exemplary embodiment of the present invention.
Figure 8:
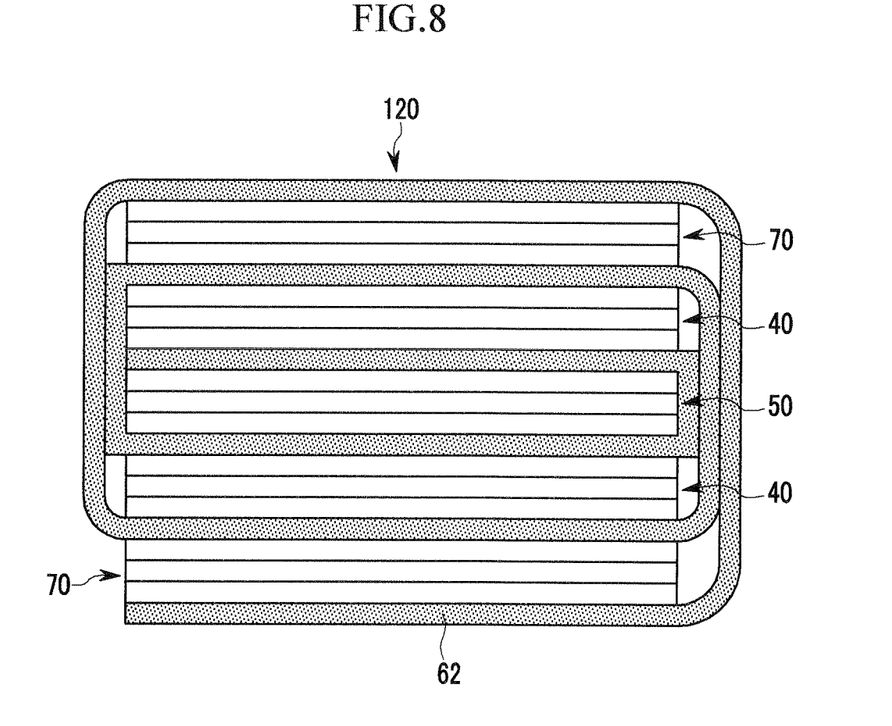
FIG. 8 shows a cross-sectional view of an electrode assembly of a rechargeable battery according to a third exemplary embodiment of the present invention.
Figure 9:
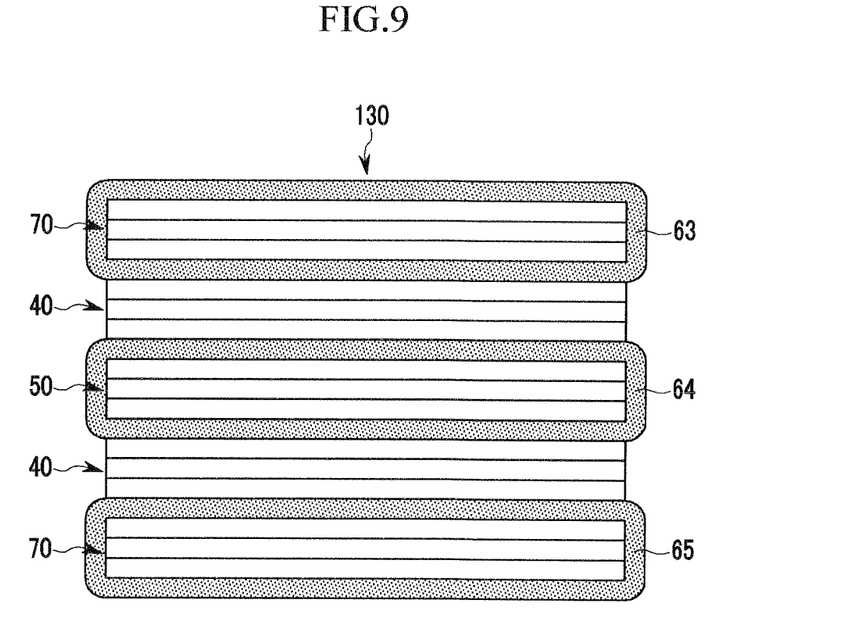
FIG. 9 shows a cross-sectional view of an electrode assembly of a rechargeable battery according to a fourth exemplary embodiment of the present invention.

FIG. 7 to FIG. 9 show a cross-sectional view of an electrode assembly of a rechargeable battery according to second, third, and fourth exemplary embodiments of the present invention. For ease of illustration, FIG. 7 to FIG. 9 exemplarily show one negative electrode 50, two positive electrodes 40, and two outermost negative electrodes 70, and the number of positive electrodes 40 and negative electrodes 50 can be greater than the example.

Referring to FIG. 7, the rechargeable battery according to the second exemplary embodiment has the same configuration as the rechargeable battery according to the first exemplary embodiment, except that the separator 61 of the electrode assembly 110 is stacked according to a zigzag pattern. The members that are the same as the first exemplary embodiment will have the same reference numerals.

Regarding the rechargeable battery according to the second exemplary embodiment, the electrode assembly 110 includes one sheet of a separator 61. The separator 61 is disposed to pass through the space between the positive electrodes 40, the negative electrodes 50 and the outermost negative electrodes 70 according to a zigzag pattern starting from the outer side of one of the pair of outermost negative electrodes 70 and finally covering the outer side of the other outermost negative electrode 70. Hence, it is easy to assemble and manufacture the electrode assembly 110.

Referring to FIG. 8, the rechargeable battery according to the third exemplary embodiment has the same configuration as the rechargeable battery according to the first exemplary embodiment except that the separator 62 of the electrode assembly 120 is formed by winding, or coiling, a separator 62 between the positive electrode 40, the negative electrodes 50 and the other outermost negative electrodes 70 toward the outer side of the electrode assembly 120 from the center thereof as a coiled pattern. The members that are the same as the first exemplary embodiment will have the same reference numerals.

Regarding the rechargeable battery according to the third exemplary embodiment, the electrode assembly 120 includes one sheet of a separator 62. The separator 62 is disposed to start from between a first one of the positive electrodes 40 and the negative electrode 50 provided near the center of the electrode assembly 120, and is wound around one end of the negative electrode 50 and back between the second one of the positive electrodes 40 (clockwise, as illustrated, but not limited thereto). Separator 62 is then wound around the ends of the positive electrode 50 and the first one of the negative electrodes 40 to pass between the first one of the positive electrodes 40 and a first one of the outermost negative electrodes 70, and then wound around the ends of the electrodes 40 and 50 to pass between the second one of the positive electrodes 40 and the second one of the outermost negative electrodes 70. The Separator 62 is then wound around the ends of electrodes 40, 50 and 70 to cover the outer side of the first one of the outermost negative electrodes 70, then wound around the ends of all the electrodes 40, 50 and 70 to cover the outer side of the second one of the outermost negative electrodes 70. Therefore, a first end of the separator 62 is provided at the portion between the positive electrode 40 and the negative electrode 50 near the center of the electrode assembly 120, and an opposite second end thereof is provided at the outer side of the second one of the outermost negative electrodes 70.

Referring to FIG. 9, the rechargeable battery according to the fourth exemplary embodiment has the same configuration as the rechargeable battery according to the first exemplary embodiment, except that separator 63, 64 and 65 of the electrode assembly 130 are envelope-type separators wrapping a first one of the outermost negative electrodes 70, the negative electrode 50 and a first one of the outermost negative electrodes 70, respectively. The members that are the same as the first exemplary embodiment will have the same reference numerals.

Each separator 63, 64 and 65 is formed to wrap the inner side, outer side, and lateral side of the corresponding negative electrode 50 and corresponding outermost negative electrodes 70.

Regarding the rechargeable battery according to the second exemplary embodiment to the fourth exemplary embodiment, the separators 61, 62, and 63-65 are formed to partially or entirely wrap the lateral sides of the electrodes 40 and 50. In this case, the internal short circuit caused by shrinkage of the separators 61, 62, and 63 can be efficiently prevented.

Regarding the conventional rechargeable battery, shrinkage of the separator is greater than the shrinkage of the electrodes (positive electrode and negative electrode) at a high temperature, so the positive active material layer contacts the negative active material layer at edges of the electrode to generate a short circuit. Regarding the rechargeable battery according to the second exemplary embodiment to the fourth exemplary embodiment, the separators 61-65 are formed to partially or entirely wrap the lateral sides of the electrodes 40 and 50 thereby efficiently control the above-noted short circuit. As a result, durability and safety of the rechargeable battery are improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
    an electrode assembly including a separator and a positive electrode and a negative electrode that are stacked with the separator therebetween;
    a case for receiving the electrode assembly; and
    an electrode terminal connected to the electrode assembly, wherein the electrode assembly includes a pair of outermost negative electrodes and the pair of outermost negative electrodes respectively include a negative current collector and negative active material layers formed on both sides of the negative current collector, wherein the negative active material layers include an internal active material layer formed adjacent to inner most side of the negative current collector and an external active material layer formed adjacent to an outer most side of the negative current collector, and the external active material layer includes a negative active material that is different from the internal active material layer.

2. The rechargeable battery of claim 1, wherein the external active material layer includes graphite.

3. The rechargeable battery of claim 2, wherein the external active material layer has the same size and thickness as the internal active material layer.

4. The rechargeable battery of claim 1, wherein the external active material layer includes one of amorphous carbon and silicon oxide.

5. The rechargeable battery of claim 1, wherein the negative active material layers includes an external active material layer formed adjacent to an outer most side of the negative current collector, and the external active material layer includes at least one of crystalline carbon, amorphous carbon, and silicon oxide.

6. The rechargeable battery of claim 1, wherein a plurality of positive electrodes and negative electrodes are stacked, and a number of the negative electrodes including the pair of outermost negative electrodes is greater than a number of the positive electrodes by one.

7. The rechargeable battery of claim 6, wherein the separator is formed as a single sheet.

8. The rechargeable battery of claim 6, wherein the separator is disposed to pass between each of the electrodes according to a zigzag pattern from the outer side of a first one of the pair of outermost negative electrodes, and then cover an outer most side of a second one of the pair of outermost negative electrodes.

9. The rechargeable battery of claim 6, wherein the separator is disposed to pass between each of the electrodes according to a coiled pattern starting from the portion between a central negative electrode and a first one of the positive electrodes provided near the center of the electrode assembly, toward and covering outer most sides of the electrode assembly.

10. The rechargeable battery of claim 6, wherein the separator is comprised of a plurality of separators, each of the separators being disposed to wrap, respectively, a central negative electrode and the outermost negative electrodes.

* * * * *